United States Patent
Sakatani et al.

(10) Patent No.: US 9,936,539 B2
(45) Date of Patent: Apr. 3, 2018

(54) SEAT HEATER

(71) Applicant: Panasonic Intellectual Property Management Co., Ltd., Osaka (JP)

(72) Inventors: Shigeaki Sakatani, Osaka (JP); Kazuma Oikawa, Osaka (JP); Kentaro Takada, Osaka (JP); Norio Abe, Shiga (JP); Takaaki Hyoudou, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 222 days.

(21) Appl. No.: 14/774,667

(22) PCT Filed: Jun. 4, 2014

(86) PCT No.: PCT/JP2014/002963
§ 371 (c)(1),
(2) Date: Sep. 10, 2015

(87) PCT Pub. No.: WO2014/199595
PCT Pub. Date: Dec. 18, 2014

(65) Prior Publication Data
US 2016/0029438 A1    Jan. 28, 2016

(30) Foreign Application Priority Data
Jun. 10, 2013    (JP) .................... 2013-121515

(51) Int. Cl.
*H05B 3/14*    (2006.01)
*B60N 2/56*    (2006.01)
(Continued)

(52) U.S. Cl.
CPC ............. *H05B 3/36* (2013.01); *B60H 1/00* (2013.01); *B60N 2/56* (2013.01); *B60N 2/5685* (2013.01);
(Continued)

(58) Field of Classification Search
None
See application file for complete search history.

(56) References Cited

U.S. PATENT DOCUMENTS

| | | | |
|---|---|---|---|
| 6,197,270 B1 | 3/2001 | Sonoda et al. | |
| 2006/0199455 A1* | 9/2006 | Stepanian | ............ B01J 13/0091 442/59 |

(Continued)

FOREIGN PATENT DOCUMENTS

| | | |
|---|---|---|
| CN | 102351494 | 2/2012 |
| CN | 102450091 | 5/2012 |

(Continued)

OTHER PUBLICATIONS

English Translation of Chinese Search Report dated Dec. 13, 2016 for the related Chinese Patent Application No. 2014800290286.

(Continued)

*Primary Examiner* — Joseph M Pelham
(74) *Attorney, Agent, or Firm* — Panasonic IP Management; Kerry S. Culpepper

(57) ABSTRACT

A seat heater that is a seat including: a planer heating element that has a plurality of electric heating wires on its upper surface and that includes a fiber layer; a cushion member that locates over a lower surface of the planer heating element; and a skin that locates above the planer heating element, wherein the planer heating element has, in voids of the fiber layer, a silica aerogel that is a silica porous body having pores with a mean pore diameter of 10 nm to 68 nm.

11 Claims, 5 Drawing Sheets

(51) Int. Cl.
*A47C 7/74* (2006.01)
*H05B 3/34* (2006.01)
*H05B 3/36* (2006.01)
*B60H 1/00* (2006.01)
*H05B 1/00* (2006.01)

(52) U.S. Cl.
CPC ............... *H05B 1/00* (2013.01); *H05B 3/342* (2013.01); *H05B 2203/014* (2013.01); *H05B 2203/02* (2013.01); *H05B 2203/029* (2013.01); *H05B 2203/037* (2013.01)

(56) References Cited

U.S. PATENT DOCUMENTS

| | | | |
|---|---|---|---|
| 2009/0134676 A1* | 5/2009 | Trimbakrao | B60N 2/58 297/180.12 |
| 2012/0025127 A1* | 2/2012 | Yeo | C01B 33/155 252/62 |
| 2012/0049586 A1 | 3/2012 | Yoshimoto et al. | |
| 2013/0062338 A1* | 3/2013 | Iida | F16L 53/008 219/548 |
| 2015/0373781 A1* | 12/2015 | Augustine | H05B 1/0272 219/212 |
| 2016/0003404 A1* | 1/2016 | Shibata | C04B 38/00 428/192 |

FOREIGN PATENT DOCUMENTS

| | | |
|---|---|---|
| CN | 102860123 A | 1/2013 |
| EP | 1375446 | 1/2004 |
| GB | 2136659 | 9/1984 |
| JP | 3-087117 U | 9/1991 |
| JP | 2525454 Y | 2/1997 |
| JP | 10-236817 | 9/1998 |
| JP | 2000-351677 | 12/2000 |
| JP | 3339394 B | 10/2002 |
| JP | 2008-067850 | 3/2008 |
| JP | 2009-268718 | 11/2009 |
| JP | 2009268718 A * | 11/2009 |
| JP | 2012-045273 | 3/2012 |
| JP | 2013-004243 | 1/2013 |
| JP | 5428197 B | 2/2014 |

OTHER PUBLICATIONS

The Extended European Search Report dated May 9, 2016 for the related European Patent Application No. 14811442.4.
International Search Report of PCT application No. PCT/JP2014/002963 dated Jul. 22, 2014.
English Translation of Chinese Search Report dated Aug. 9, 2017 for the related Chinese Patent Application No. 201480029028.6.

* cited by examiner

[FIG. 1A]
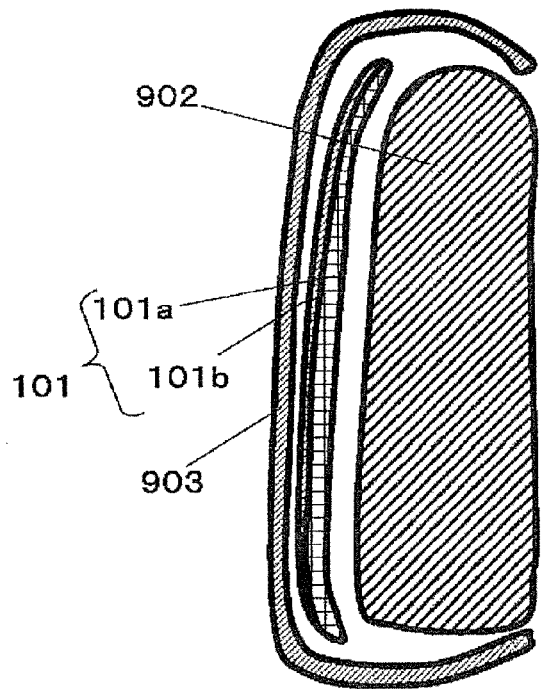
[FIG. 1B]
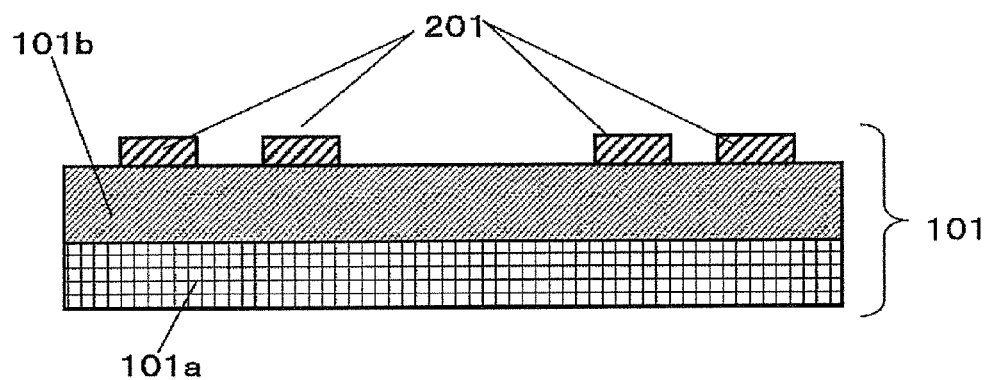

[FIG. 2]
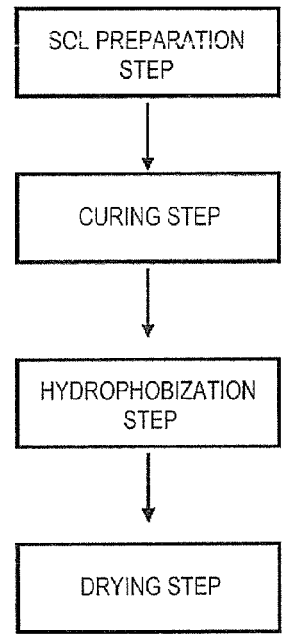
[FIG. 3]
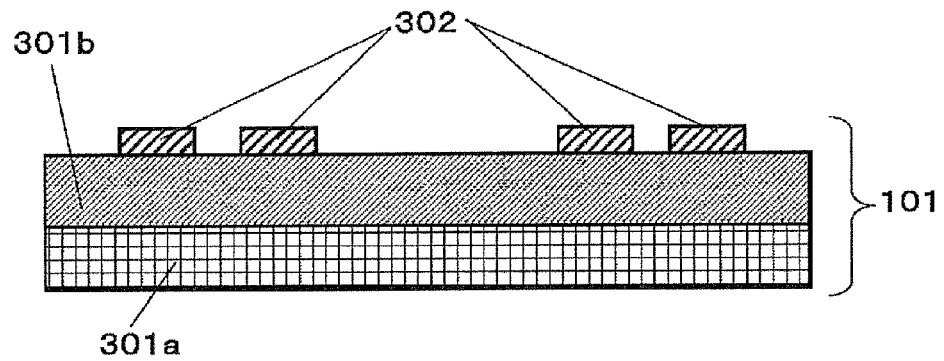
[FIG. 4]
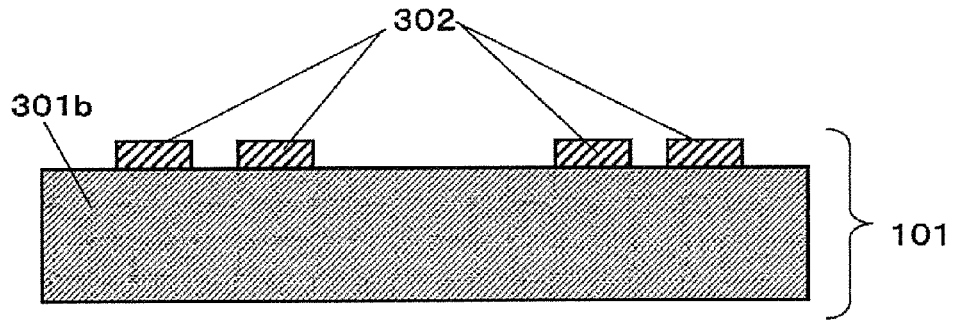

[FIG. 5]
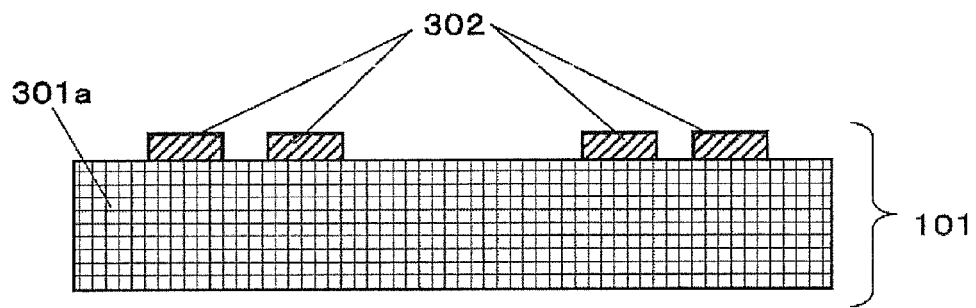
[FIG. 6]
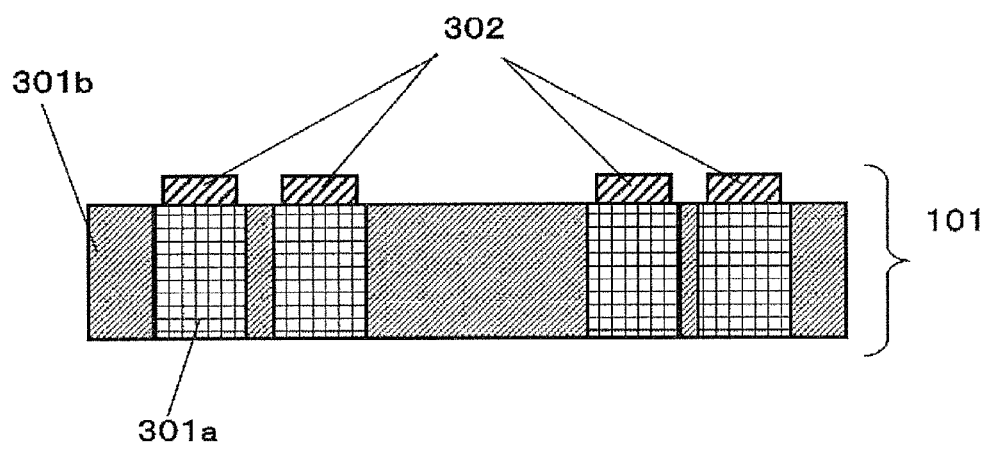
[FIG. 7A]
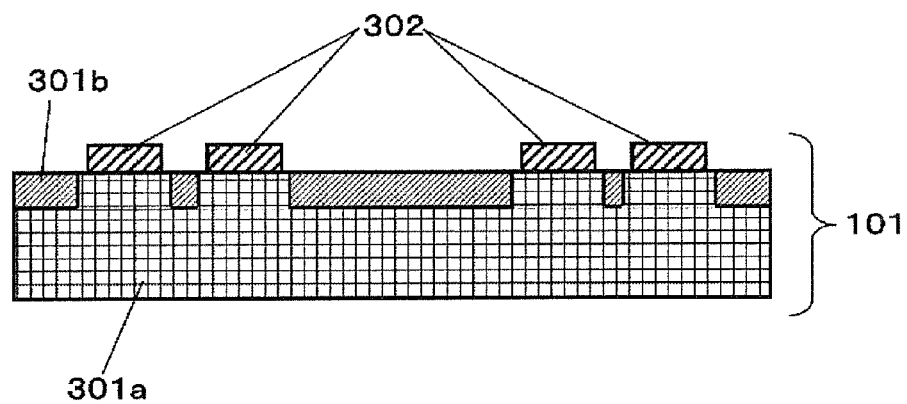

[FIG. 7B]
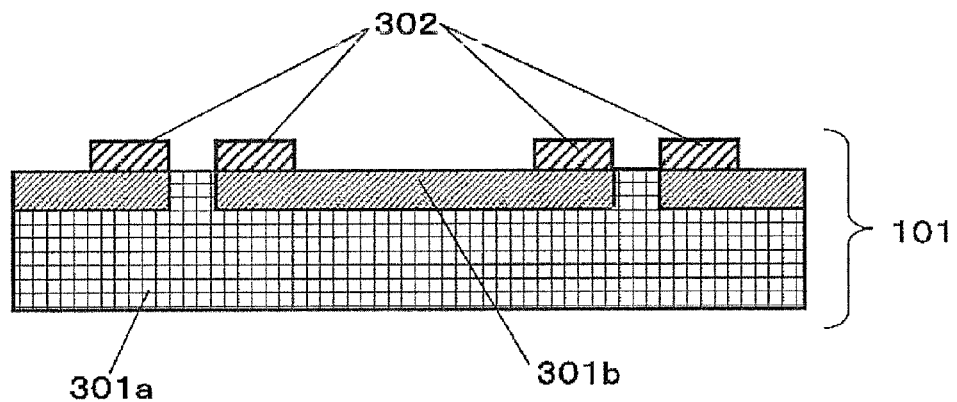
[FIG. 7C]
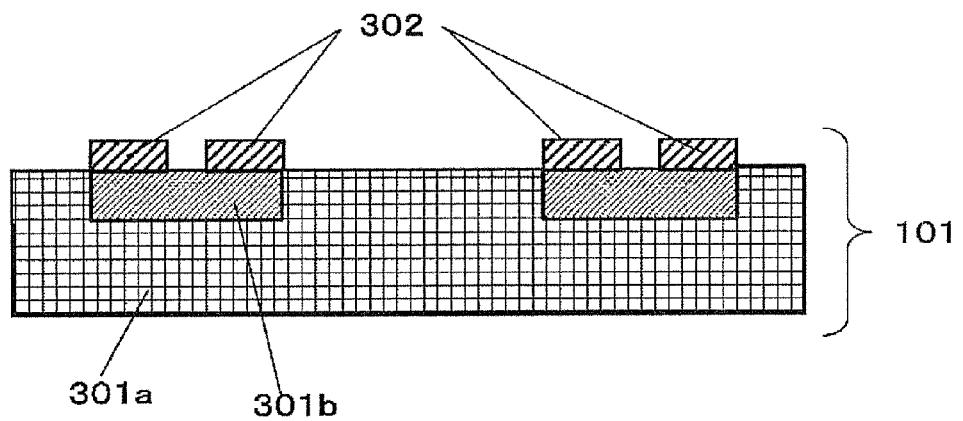
[FIG. 8]
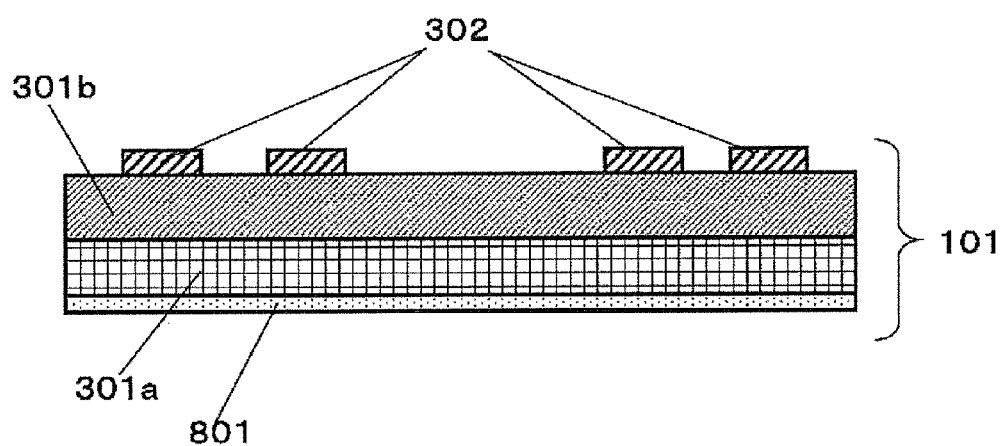

[FIG. 9]
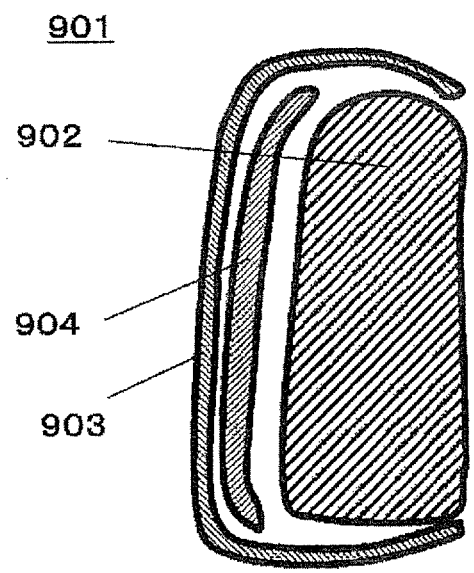
PRIOR ART

SEAT HEATER

CROSS-REFERENCE TO RELATED APPLICATIONS

This application is a U.S. national stage application of the PCT International Application No. PCT/JP2014/002963 filed on Jun. 4, 2014, which claims the benefit of foreign priority of Japanese patent applications 2046-121515 filed on Jun. 10, 2013, the contents all of which are incorporated herein by reference.

TECHNICAL FIELD

The technical field relates generally to a heating seat and, more particularly, to a heat insulation structure that provides a seat using a heating seat with excellent heat efficiency.

BACKGROUND ART

As examples of conventional heating seats, there have been heating seats in which a seat heater is placed between a cushion member for seats and a skin material covering it, as seen in seats installed in automobiles (e.g., see Patent Literature 1).

Such a seat heater is installed in automobiles or the like in order to improve comforts during the cold season. However, from the viewpoint of energy saving, it is desirable that the function of the heater be provided with a smaller amount of power.

Especially in recent years, distribution of electric vehicles has been demanded. As a result, it is required that the energy efficiency be increased as nigh as possible, thereby providing a heater with less power consumption. Therefore, this is a quite important technique, since this leads to an increase in the driving range. In such a viewpoint, it can be considered that railroad vehicles and airplanes also suffer from the same problem.

FIG. 9 is a cross-section view of a conventional heating seat 901. A skin 903 is placed to cover the upper side of a cushion member 902 of the seat 901 installed in an automobile. A seat heater 904 is placed between the skin 903 and the cushion member 902 (see Patent Literature 1). The seat heater 904 is a sheet-shaped electric heater that warms a hip portion of an occupant through the skin 903. Also, it is a heater that warms the back.

In general, the seat heater 904 has a structure in which electric heating wires made of copper or the like are sewn or attached onto a fiber product such as nonwoven fabric.

In addition, in the conventional heating seat 901, the heat generated from the seat heater 904 transmits to the skin 903 through heat conduction, and warms the hip portion of the occupant. Meanwhile, a part of the heat generated from the seat heater 904 also transmits to the cushion member 902 through heat conduction, and thus, is used for increasing the temperature of the cushion member 902. Therefore, a portion of the electrical energy generated in the vehicle is not used for the original purpose of heating by the amount of the heat that transmits to the cushion member 902. Consequently, there was a problem that the fuel efficiency was lowered.

In order to suppress the heat transfer to the side of the cushion member 902, a structure in which a heat insulation material is placed between the cushion member 902 and the seat heater 904 has been proposed (Patent Literature 2). In Patent Literature 2, a vacuumed heat insulation material obtained by vacuum-sealing a core material, which is made of silica-based fibers such as such glass wool, with a laminate film is used as the heat insulation material. The heat insulation material prevents a part of the heat generated from the seat heater 904 from being released to the cushion member 902. It is expected that this causes an effect to promote the initial rise of the temperature of the side of the skin 903.

Furthermore, It is suggested that, by disposing, between the cushion member 902 and the seat heater 904, a heat insulation element having a heat conductivity smaller than that of the cushion member 902, the heat transfer from the seat heater 904 to the cushion member 902 can be suppressed, thereby realizing heating of the seat 901 with a smaller amount of the heat generation from a planer heating element.

It is considered that this has a great advantage since the heat generated in the seat heater 904 is effectively utilized, thereby improving the energy efficiency.

However, in the conventional configuration (Patent Literature 2), there is an effect to suppress the heat that is released to the cushion member 902, due to the heat insulation element between the cushion member 902 and the seat heater 904. However, since the heat is transmitted to an air layer included in the heat insulation element over the time, and is conveyed to the cushion member 902, there was a problem of heat loss.

With regard to a heating seat 901, the invention is to solve the above conventional problems, and relates to a heat insulation structure that suppresses heat transfer to a cushion member 902 provided in the seat 901, thereby providing a heating seat 901 with excellent heat efficiency.

CITATION LIST

Patent Literature

PTL 1: JP-A-2008-67850
PTL 2: JP-A-2009-268718

SUMMARY OF INVENTION

In order to achieve the above object, a seat heater of the invention has a structure in which an aerogel layer including porous silica, with pores of 68 nm or less, where the value of 68 nm is a mean free path, is retained in the whole or a portion of a substrate made of a fiber product such as nonwoven fabric. In such a layer, heat transfer through the air is prevented, thereby producing an excellent heat insulation effect. The conduction of the heat generated by electric heating wires provided on the surface layer of the fibers is prevented by the aerogel layer. Therefore, efficient heat transmission to required portions is realized.

According to the seat heater including the porous silica of the invention, heat conduction and heat insulation can selectively be controlled by suppressing heat conduction through the air layer, while using a fiber substrate having flexibility, thereby efficiently and quickly homogenizing, within the plane, the heat generated by electric heating wires of the heater.

BRIEF DESCRIPTION OF DRAWINGS

FIG. 1A is a cross-section view of a heating seat in a first embodiment.

FIG. 1B is a cross-section, view of a planar heating element in the first embodiment.

FIG. 2 is a flow chart of production steps for the planar heating element in the first embodiment.

FIG. 3 is a cross-section view of a planar heating element in Example 1.

FIG. 4 is a cross-section view of a planar heating element in Comparative Example 1.

FIG. 5 is a cross-section view of a planar heating element in Example 2.

FIG. 6 is a cross-section view of a planar heating element in a second embodiment.

FIG. 7A is a cross-section view of a planar heating element in Example 3.

FIG. 7B is a cross-section view of a planar heating element in Example 4.

FIG. 7C is a cross-section view of a planar heating element in Example 5.

FIG. 8 is a cross-section view of a planar heating element in Example 6.

FIG. 9 is a schematic cross-section view of a conventional heating seat described in Patent Literature 1.

DESCRIPTION OF EMBODIMENTS

Embodiments of the invention will be described below with reference to the drawings. In addition, the embodiments shall not be construed to limit the invention.

(First Embodiment)

FIG. 1A represents a schematic cross-section, view of a heating seat 901 in the first embodiment, and FIG. 1B is a schematic cross-section view of a seat heater for automobile seats in the first embodiment. In FIGS. 1A and 1B, the same reference numerals are used for the same elements as those in FIG. 9, and the descriptions therefor will be omitted.

The first embodiment will be described by use of FIGS. 1A and 1B.

FIG. 1A is a cross-section view of a heating seat 901 for automobiles. In the figure, the left side corresponds to the front side of the vehicle body, and the right side corresponds to the rear side of the vehicle body. The seat 901 includes a cushion member 902, a planar heating element 101 that is placed over the cushion member 902, and a skin 903 that is placed over the planar heating element 101.

FIG. 1B is a cross-section view of the planar heating element 101 in the first embodiment. In the figure, the upper side corresponds to the front side of the vehicle body, and the lower side corresponds to the rear side of the vehicle body, concerning the placement direction.

The planar heating element 101 includes electric heating wires 201, a fiber layer 101b, and an aerogel layer 101a that includes silica placed in voids between the fibers.

<Electric Heating Wire 201>

The electric heating wires 201 are those obtained by placing electric heating wires thereon, followed by molding it into a planer shape, products on which a PTC (positive temperature coefficient) resistor and an electrode are printed, those obtained by thermo-compressing a PTC resistor, which has been extruded into a sheet-shaped thin film, onto an unwoven fabric or resin sheet together with an electrode, or the like.

<Fiber Layer 101b>

The fiber layer 101b is composed of composite fibers including PET (polyethylene terephthalate), pulp or the like, cellulose-based products, or resin-based fibers or unwoven fabrics such as of polypropylene or PVA (polyvinyl alcohol). More preferably, those obtained by subjecting fibers to a flame-retardant treatment should be used in terms of safety, and, for example, it is considered that a phosphorous flame retardant is suitable as a flame retardant therefor. In addition, inorganic fibers such as glass wool may be used.

When a resin sheet is used as the fiber layer 101b, a powder of silica aerogel having a particle diameter of 100 nm to 500 μm is preferably homogeneously mixed thereto.

If a powder having a smaller particle diameter than the above range is used therein, the specific surface area will be extremely increased. As a result, the viscosity of the resin will excessively be increased, and the moldability will be impaired.

If the particle diameter is larger than the above range, the uniformity when the particles are distributed therein will be impaired. As a result, an effect to lower the heat conductivity may be deteriorated.

As shown in FIG. 1B, the silica aerogel layer 101a is included in a portion under the fiber layer 101b in a portion of fibers extending from the fiber layer 101b. The electric heating wires 201 made of copper or the like are sewn and attached to the fiber layer 101b made of only fibers, with a string material or the like. In addition, an opening part may be provided in a predetermined position thereof in order to prevent skin-hanging parts.

<Aerogel Layer 101a>

The aerogel layer 101a made of silica is a layer that exists in such a manner that the aerogel has entered voids in the fiber layer 101b so as to replace the air therein. The aerogel has a porous structure including pores on the scale of several tens of nanometers. With regard to the heat insulation performance of the aerogel layer 101a of silica, the heat conductivity is generally 0.01 W/m·K to 0.03 W/m·K. In addition, as to nonwoven fabric using fibers such as of PET, or heat-insulating glass wool, their heat conductivity is generally 0.04 W/m·K to 0.07 W/m·K.

On the other hand, with regard to a flexible urethane foam for the cushion member 902 that is used for the seat 901 in automobiles, its neat conductivity is generally 0.04 W/m·K to 0.06 W/m·K. Therefore, the heat conductivity of the aerogel layer 101a is lower, compared with that of the fiber layer 101b of only fibers or the cushion member 902, and its heat insulation performance is high.

<Effect>

According to the above configuration, the aerogel layer 101a having a smaller heat conductivity than that of the cushion member 902, and that of the fiber layer 101b is placed inside the planar heating element 101. This allows suppressing heat transfer from the planar heating element 101 to the cushion member 902. As a result, heating of the seat 901 can be realized with a smaller amount of heat generated from the planar heating element 101, and thus, an energy-saving effect will be brought about. In addition, heating of the seat 901 can be realized while causing only a smaller amount of heat generation.

Thus, especially in cases where electric heating by use of the planar heating element 101 or the like is conducted in automobiles such as gasoline-powered or diesel-powered automobiles in which power generation is carried out using a fuel, the amount of power supplied to the planar heating element 101 can be reduced according to the above configuration. For this reason, it becomes possible to save a fuel required for power generation, thereby reducing the fuel consumption. In addition, when the supply power is reduced as described above, the capacity of the power generator for power generation or the storage battery for storing the generated power can be made smaller. This will achieve weight saving, and such weight saving will further lead to reduction in the fuel consumption.

Furthermore, when a load is applied to the seat 901 by seating of the human body, the aerogel layer 101*a* essentially follows the fibers, and maintains flexibility, because the aerogel layer 101*a* is retained by the fibers. Therefore, the comfortable seating will not be impaired.

<Aerogel Layer 101*a*>

As for the aerogel, silica aerogel that is a porous body of silica having pores of 10 nm to 68 nm is preferred. Such silica aerogel is a component of a heat insulation material having a heat conductivity smaller than that of the air. It is possible to suppress the heat transfer from the planar heating element 101 to the cushion member 902, and heating of the seat 901 can be realized with a smaller amount of heat generated from the planar heating element 101.

In a case of pores of greater than 68 nm, since this means that the pores are greater than 68 nm, which corresponds to a mean free path of the air, the air can freely move within pores. In the aerogel prepared in the invention, the pores are not independent from one another, and are formed in such a manner that they are connected to one another. Consequently, the air present within the pores of the aerogel freely moves, and the effect to suppress the heat conduction of the air will be weakened.

On the other hand, if the pores are smaller than 10 nm, a percentage of a pore volume of the whole becomes smaller, although there may be a certain effect to confine the air therein. Consequently, characteristics (heat conductivity) of solid heat conduction will be enhanced, and such a material is not suitable as a heat insulation material.

The above-mentioned pore size is a mean value. The aerogel has a three-dimensional structure, and not all of the pores need to be within the above range. As long as the mean value is within the above range, the above-mentioned effect will be brought about as a whole.

In addition, instead of the mean value, it is more preferable that sizes of all of the pores are within the above numerical range.

<Surface of the Aerogel Layer 101*a*>

It is preferable that the surface of the silica aerogel and the wall, surface of the pores are hydrophobic so as to exhibit a water contact angle of 110° or higher. Those having a trimethylsilyl or methyl group as a functional group on the surfaces are favorable. Furthermore, the size of the pores are preferably 20 nm to 68 nm. As a result, heat transfer from the planar heating element 101 to the cushion member 902 can be suppressed, and heating of the seat 901 can be realized with a small amount of heat generated by the planar heating element 101.

When the water contact angle is greater than 110°, the water that is in contact with the surface of the aerogel will be almost spherical, and the water can be prevented from being drawn into the pores of the gel due to capillary action of the pores.

Further, if the water contact angle is 160° or higher, it becomes very difficult to bond the material to, for example, an adhesive, and crimping based on hole-making or fixation based on insulation lock is required for the attachment in the production.

The water contact angle is preferably 120° to 150°, the range of which corresponds to a range obtained by narrowing the above range by 10°.

As to the functional groups, as long as they are allowed to include a trimethylsilyl or methyl group, occurrence of hydrogen bonds with water molecules that may be found in a hydroxyl group or a carboxyl group having a hydroxyl group can be suppressed.

A starting material for the silica aerogel is an alkoxysilane or water glass. The silica aerogel is a silica porous body that is prepared based on a sol-gel synthesis reaction. Since such a silica porous body is an aggregate in which fine particles are arrayed, the porous body can deform when a load is applied to the seat 901 by seating of the human body. As a result, comforts of seating on the cushion or the like will not be deteriorated.

In aerogel synthesized from an alkoxysilane or water glass, pores are not independent from one another, and the aerogel is formed in such a manner that the pores are connected to one another, and also, primary particles of silica are bunched together. According to such a structure, since the aggregate of the bunch can deform against an external force as a whole, and flexibility of the fibers alone is exerted, any sense of discomfort will not be caused for seating.

<Particle Diameter>

As for the silica aerogel, a powder including, as a main, component, a silica powder such as fumed silica (e.g., Aerosil), colloidal silica, or hollow silica having a hollow structure, as fine particles for reinforcing the gel skeleton, in the porous silica is preferred. The powder preferably contains those having a particle diameter of 10 nm to 200 nm.

As to silica powders such as fumed silica (e.g., Aerosil), colloidal silica, and hollow silica having a hollow structure, their surfaces have hydrophilic groups so as to be hydrophilic, and therefore, they can uniformly be dispersed in an alkoxysilane or water glass.

If the particle diameter is greater than 200 nm, this gives rise to a requirement that a dispersing agent be added thereto in order to prevent the sedimentation, and heat conductance possessed by the particles themselves becomes intolerable. Consequently, addition of the particles will foe a factor that deteriorates the heat insulation performance.

If the particle diameter is smaller than 10 nm, the particles become smaller than the pores, and the strength of the gel skeleton cannot be enhanced.

The above-mentioned particle diameter is a mean value. The aerogel has a throe-dimensional structure. Therefore, even when not all of the particles are within the above numerical range, the above-described, effect will be brought about as a whole as long as the mean value thereof is within the above range.

In addition, instead of the mean value, it is more preferable that the absolute values of the particle diameters are each, within the above numerical range.

<Method for Forming the Aerogel Layer 101*a*>

Next, a method for forming the aerogel layer 101*a* in the first embodiment of the invention will be described with reference to the flowchart of FIG. 2. At first, a method for producing the aerogel will briefly be described. However, a method for producing the aerogel will not be limited thereto.

Formation of the aerogel layer 101*a* includes a sol preparation step, a curing step, a hydrophobization step, and a drying step, as shown in FIG. 2.

<Sol Preparation Step>

A pH of a sodium water glass aqueous solution is adjusted to 3 or less with an acidic ion-exchange resin or a mineral acid. In this case, the concentration of $SiO_2$ may be 6 wt % to 20 wt %, more preferably 8 wt % to 17 wt %.

If the concentration, is less than 6 wt %, the gel skeleton will be weak. Therefore, the gel will be shrunk by stress applied to the gel during drying, and a porous body cannot be obtained.

If the concentration is excessively higher than 20 wt %, the skeleton will be sufficiently strong. However, variations in the concentration are likely to be caused, and the gelation rapidly proceeds. Therefore, it becomes difficult to obtain uniform gel.

Furthermore, when the concentration is within the range of 8 wt % to 17 wt %, there will be further the following advantages besides the above advantages. The time required to impregnate the fibers, for example, the gelation time of 5 minutes or more, can be obtained, and uniform gel can be obtained. Therefore, it is considered that the above range is a suitable concentration range in view of workability and gel physical properties.

For the acidic ion-exchange resin, a resin having a sulfo group is preferable, and, when a mineral acid is added to the above-mentioned aqueous solution, hydrochloric or sulfuric acid is suitable. However, the acidic ion-exchange resin and the mineral acid are not limited to these materials.

Then, a base is added thereto so as to adjust the pH to around 7. The base to be added in this case may be aqueous ammonia, NaOH, KOH, or the like. However, the base is not limited to these substances.

Then, until the gelation is started, a desired part of PET fibers is quickly impregnated with the sol solution. An impregnation technique therefor may be a soaking method, coating method, or drawing. However, it is required that the impregnation foe completed when the gelation is completed.

In the above explanation, steps are described from the step of conducting elimination of Na. However, a method in which an aqueous solution that has been stabilized by subjecting it to elimination of Na in advance may be used, and in which the fibers are impregnated with a sol solution obtained by adjusting the pH of the aqueous solution to around 7 may also be adopted.

<Curing Step>

Next, in order to strengthen the gel skeleton, the fibers themselves are allowed to stand at 20° C. to less than 100° C., more preferably 80° C to less than 100° C.

Additionally, during that time, in order to prevent dryness of the gel, the material is preferably soaked in water or an organic solvent. Examples of the organic solvent include IPA, ethanol, petrolatum, toluene, xylene and the like.

Especially, in a case of toluene or xylene, which is a non-polar solvent immiscible with water, the solvent exhibits only an effect to prevent dryness of the surface of the gel, and there is no concern of elution of a water component retained in the gel, since there is not any compatibilization due to penetration of the solvent into the gel.

For this reason, as for the required time, 1 or more hours, preferably 10 or more hours may be sufficient.

If the temperature is lower than 20° C., the gelation will proceed, over time, but it takes a long time for formation of the gel skeleton. For example, when the temperature is 10° C., it is required to allow stand the material for 50 hours.

On the other hand, if the temperature is 100° C. or higher, water in the gel or water that the material is soaked on the surface will come to the boil, and the dryness or collapse of the gel will be caused. Therefore, it is difficult to adopt such a temperature range.

In order to reinforce the gel skeleton and to carry out curing for a short time, 80° C. to less than 100° C. is preferable, and 80° C. to 95° C. is more preferable. This is because evaporation becomes drastic as the temperature approaches 100° C., and such a condition is not suitable.

For example, when the temperature is 80° C., heating may be conducted for 12 or more hours. When the temperature is 95° C., the reinforcement will be completed by heating for 5 or more hours.

Even in a case of heating at 20° C. to less than 80° C., any problem will not occur when a sufficient heating time is ensured.

At this point, the gel has a shape of porous body. However, because the wall surface of the gel includes silanol groups so as to be hydrophilic, the porous body will be destroyed and shrunk due to a stress depending on the surface tension of water during drying.

<Hydrophobization Step>

In order to prevent the shrinkage behavior, the surface of the gel is substituted with hydrophobic groups. As for a liquid used for the hydrophobization, mono-, di- or tri-methylchlorosilane, or trimethylmethoxysilane or hexamethyldisiloxane is reacted with hydrochloric acid. The reaction should be conducted at 20° C. to 100° C., more preferably 30° C. to 70° C. In addition, acceleration based on sonication is an effective means for this reaction.

If the temperature is lower than 20° C., the reaction does not proceed. If the temperature is higher than 100° C., evaporation will occur, and this results in changes in the acidity. When the temperature is 30° C. or higher, the reaction will proceed, and therefore, this is preferred. When the temperature is 70° C. or less, no evaporation will occur, and the reaction will proceed.

The reaction allows substitution of silanol groups, for example, with trimethylsilyl groups, and the properties of the gel surface and the well surface of the porous body inside the gel are replaced with hydrophobic properties.

Furthermore, in order to reduce the water content, the water may be replaced with an organic solvent prior to the hydrophobization, As for the organic solvent used herein, in general, aliphatic alcohols, ethers, esters or ketones, or aliphatic or aromatic hydrocarbons can be mentioned. Preferred solvents are methanol, ethanol, isopropyl alcohol, acetone and the like, and a mixture of these solvents may also be used.

<Drying Step>

Finally, the solution contained therein can be dried to prepare fibers having a desired aerogel layer 101a. Moreover, as for drying, the material may be dried by increasing the temperature to a boiling point of the solvent or higher, or by drying the material below the boiling point over time. Furthermore, a supercritical drying method, or a drying method using microwaves may also be used therefor.

Results reviewed in multiple examples will be described below.

EXAMPLE 1

As fibers to be impregnated with an aerogel layer 301a, those made of PET with a thickness of 1 mm, with a fiber basis weight of 105 g/m$^2$ and with a fiber diameter of about 30 μm were selected.

Next, sodium was removed from sodium silicate. A 12 N hydrochloric acid was dropwise added to a water glass aqueous solution with an $SiO_2$ concentration increased to 16 wt %, and the resulting solution was stirred, thereby adjusting the pH thereof to around 7 to 7.5.

Then, a theoretical value that allowed half of the thickness of the fibers to be filled with the gel was calculated. The PET and the sol solution were uniformly coated onto the fibers from their surface layer at a weight ratio of 1:2.5, and were gelated in the fibers.

Then, water was added thereto, and the resulting product was allowed to stand in a furnace at 80° C. for 12 hours in a state where the product was soaked in water. After 12 hours, the fibers were soaked in a mixture solution of hexamethyldisiloxane, 12 N hydrochloric acid, and isopropyl alcohol (IPA), and were allowed to stand at 55° C. for 12 hours, thereby hydrophobizing silanol groups on the surface of the gel.

In addition, IPA was used to suppress complete separation of the solution. Then, the product was dried in a drying furnace at 150° C. for 2 hours, thereby completing the product. Electric heating wires made of copper wires were sewn to the resulting fibers, i.e., PET fibers, thereby forming a planar heating element 101.

FIG. 3 is a schematic cross-section view of the planar heating element 101 in Example 1. The planar heating element 101 has a structure in which it has the aerogel layer 301a including aerogel only in a lower portion of the PET fiber layer, and a PET fiber layer 301b made of only PET fibers in an upper portion of the PET fiber layer, and has electric heating wires 302 made of copper wires on the surface layer.

COMPARATIVE EXAMPLE

FIG. 4 is a schematic cross-section view of a planar heating element 101 in Comparative Example 1 in which the aerogel layer 301a was not provided in contrast to Example 1. According to experiments, it was confirmed that, when the aerogel layer 301a is placed as seen in Example 1, the power supplied to the planar heating element 101 can be reduced by about 15%, compared with a case where the aerogel layer 301a was not placed therein. In addition, a time required to equalize the in-plane temperature was also reduced by about 2 minutes.

Example 1 was a case where the aerogel layer 301a was formed with respect to half of the fibers. With regard to the impregnation structure of the aerogel layer 301a, its application example is shown in FIG. 5.

EXAMPLE 2

FIG. 5 is a schematic cross-section view of a planar heating element 101 prepared as follows: the whole area of the PET fibers used in Example 1 was impregnated with a sol solution, which had prepared by using, as a material, the same water glass aqueous solution used in Example 1 and by adjusting the pH, the resulting material was subjected to the same curing step, hydrophobization step and drying step as in Example 1, an aerogel layer 301a made of silica was formed therein, and electric heating wires of Cu were sewn thereto. Even when the whole area of the PET fibers was impregnated with the aerogel layer 301a, as shown in FIG. 5, thereby reducing the heat conductivity of all the fibers, the above-mentioned heat insulation effect can be expected.

Furthermore, the same effect can be expected even when the aerogel layer 301a including aerogel in fibers is inserted or attached to a predetermined, position, i.e., a space between the planar heating element 101 and a cushion member 902, and the resulting product is used as a member that enhances a heat insulation effect.

(Second Embodiment)

The second embodiment will be described, by use of FIG. 6. FIG. 6 is a cross-section view of a planar heating element 101 of a heating seat in the second embodiment. The difference between the first embodiment and the second embodiment is that a drawing pattern is formed in a PET fiber layer 301b by aerogel layers 301a. This makes it possible to partially change the heat conductivity. The aerogel layers 301a are provided only in void portions of the planer heating element 101 under electric heating wires 302, the void portions of the fibers extending to the lower surface of the planer heating element 101.

In this structure, due to the aerogel layers 301a, the heat does not go to the lower part, and spreads to the plane direction. The heat is likely to transmit preferentially to areas between the electric heating wires 302 within the plane of the planar heating element 101.

Thus, this embodiment provides a seat heater characterized, in that heat homogenization is accelerated in the plane direction, in contrast with those in which a drawing pattern of the aerogel layers 301a is not formed.

In the first embodiment, the heat insulation properties are identical in the in-plane direction around the electric heating wires 302. However, in the second embodiment, a part of the heat generated from electric heating wires 302 on the planar heating element 101 preferentially transmits to portions where the aerogel layers 301a are not present, as shown in FIG. 6. This allows more efficient heat homogenization, and can suppress unnecessary heat transfer, and further brings about an energy-saving effect.

Examples 3, 4 and 5 are application examples of a structure corresponding to the second embodiment of the invention, and their cross-section views are shown in FIGS. 7A to 7C.

EXAMPLE 3

FIG. 7A. is a cross-section view of a planar heating element 101 corresponding to Example 3. In Example 3, aerogel layers 301a impregnated with aerogel are formed in a PET fiber layer 301b, and PET fiber layers 301b that only include fibers and that are not impregnated with aerogel are formed in portions of a surface layer other than portions directly under electric heating wires 302. The aerogel layers 301a are provided directly under the electric heating wires 302. Alternatively, the aerogel layers 301a are provided also over the whole area of the lower surface of the planar heating element 101. Each of the aerogel layers 301a is connected to one another. Any aerogel layer 301a is not provided directly under areas between the electric heating wires 302 in the upper portion of the planar heating element 101.

By providing a difference in the heat conductivity of the surface portion, the heat generated from the electric heating wires 302 is allowed to transmit easily and preferentially to a portion of the surface layer of the fiber substrate of the planar heating element 101. In addition, a method for producing the aerogel layers 301a, and the fiber used herein were the same as in Example 1.

EXAMPLE 4

FIG. 7B is a cross-section view of a planar heating element 101 corresponding to Example 4. In Example 4, the whole area of the lower portion of the planar heating element 101 is an aerogel layer 301a over the whole surface. The upper portion of the planar heating element 101 was configured in the following manner. In the in-plane direction of the substrate of the planar heating element 101, the aerogel layers 301a were provided, directly under areas between electric heating wires 302, having shorter intervals among areas between a plurality of electric heating wires 302. Other parts correspond to PET fiber layers 301b. Alternatively, the aerogel layers 301a were provided directly under areas only between adjacent electric heating wires 302. Alternatively, the aerogel layers 301a are provided only directly under smaller areas between the electric heating wires 302 where the electric heating wires 302 are densely packed.

By providing the aerogel layers 301*a* partially in a surface portion of the PST fiber layer 301*b*, a difference can be provided in the neat conductivity of the surface portion in the same manner as Example 3. This allowed the heat generated from the electric heating wires 302 to transmit easily and preferentially to the direction away from the electric heating wires 302 on the surface layer portion of the fiber substrate of tine planar heating element 101, thereby promoting heat homogenization, and an effect to reduce the time until the temperature came to equilibrium was confirmed. In addition, a method for producing the aerogel layers 301*a* and fibers used herein were the same as those in Example 1.

EXAMPLE 5

FIG. 7C is a cross-section view of a planar heating element 101 corresponding to Example 5. A method for producing an aerogel layer 301*a* and fibers used herein were the same as those in Example 1.

As for a technical idea, Example 5 aimed to place priority on a time until the person senses tine heat generated from electric heating wires 302, unlike Example 4. That is, in the in-plane direction of the substrate of the planar heating element 101, PET fiber layers 301*b* that did not include aerogel were provided directly under the electric heating wires 302 and in portions under areas between adjacent electric heating wires 302. Alternatively, the PST fiber layers 301*b* that do not include aerogel may foe provided directly under narrower areas between the electric heating wires 302 among areas between the plurality of the electric heating wires 302. The other portions correspond to an aerogel layer 301*a*. The whole domain of a lower portion of the planar heating element 101 also corresponds to an aerogel layer 301*a*.

According to the above structure, heat homogenization was enhanced in regions where the electric heating wires 302 were densely packed, and thus, a structure that increases the temperature was realized. Materials used therein, materials for forming the aerogel and the production method were the same as those described in Example 1. Additionally, SHOTMASTER manufactured by the Musashi Engineering, Inc. was used as a dispenser for drawing, and a drawing was formed in such a manner that a sol solution before gelation was coated onto the fibers.

With regard to effects to reduce the supply power, reductions of about 15%, about 16% and about 10% were confirmed in the cases of Examples 3, 4 and 5, respectively, compared with Comparative Example 1 that did not nave any aerogel.

(Third Embodiment)

The third embodiment will be described with reference to FIG. 8. FIG. 8 is a cross-section view of a planar heating element 101 in the third embodiment. The planar heating element 101 includes an aerogel layer 301*a*, a PET fiber layer 301*b*, electric heating wires 302, and a cover fiber layer 801.

The elements other than the cover fiber layer 801 are the same as those of the first embodiment shown in FIG. 3.

This embodiment differs from the first or second embodiments in the way that this embodiment is characterized by provision of the cover fiber layer 801 with a basis weight, not affecting flexibility and cushion properties, on one side or both the sides, in order to prevent slipping of silica aerogel particles that form a silica porous body, thereby improving durability.

As described in the first embodiment, there remains adhesiveness on the surface until completion of gelation after coating of the sol preparation solution onto the fibers. At this stage, a thin cover fiber layer 801 is attached thereto, and the gelation is completed. This allows the cover fiber layer 801 to be secured to the aerogel layer 301*a*. Consequently, it is not required to provide any new adhesive layer, and an efficient measure against powder dropping can be realized.

As an example of the cover fiber layer 801, spun-bonded fibers are preferable, and, as to a basis weight of fibers, fibers with a basis weight 20 $g/m^2$ to 100 $g/m^2$ are preferable.

This case corresponds to spun-bonded fibers with a fiber thickness of about 0.1 to 0.3 mm. That is, if the thickness deviates from this range, the fibers do not satisfy function of a cover layer.

If the basis weight is smaller than 20 $g/m^2$, voids between the fibers become large, the aerogel particles will then slip from gaps of the voids, and a protective effect cannot sufficiently be exhibited.

On the other hand, if the basis weight exceeds 100 $g/m^2$, the thickness will be increased, influences of the heat conductivity of the cover fiber layer 801 cannot be ignored, and heat insulation performance of the planar heating element cannot sufficiently be exhibited.

EXAMPLE 6

In Example 6, spun-bonded fibers of PET with a thickness of 0.15 mm and with a basis weight of 60 $g/m^2$ were used as a cover fiber layer 801. Other members were the same as those in Example 5. In the evaluation, Example 6 was comparable to Example 1 in terms of the effect, and as compared with Comparative Example 1, the same energy-saving effect as that seen in Example 1 could be observed.

Moreover, although a case where a measure against powder dropping is present only on one side is described in Example 6, the same measure against powder dropping and energy-saving effect can be expected even when the cover fiber layers 801 are laminated and placed onto both the surfaces so as to prevent the powder dropping, in a case where the aerogel is exposed on the whole area of the surface as shown in FIG. 5.

Furthermore, although fibers were used for the cover fiber layer 801 in Example 6, an organic film of PET or the like with a thickness of 0.3 mm or less can be laminated thereon, thereby preventing the powder dropping without impairing the flexibility.

In addition, although configurations for conducting heating on seat surfaces of the seats 901 are disclosed in Examples 1 to 6, the same configurations may be adopted for conducting heating in a backrest or armrest of a seat, headrest, ottoman, door trim, steering wheel and the like. Also, the same configuration may be adopted for conducting radiation heating in a ceiling or at the feet.

Additionally, a fiber structure in which no electric heating wires 302 are provided can be used solely as a heat insulation member in the planar heating element, and the cover fiber layer 801 can be formed on both the sides or one side thereof, in order to prevent slipping of the silica aerogel particles, thereby forming a heat insulation member maintaining excellent heat insulation performance.

The above embodiments can be combined appropriately depending on cases.

INDUSTRIAL APPLICABILITY

As described above, the seat according to the invention can be expanded to a variety of heaters in various seats such as in automobiles, general houses, offices, aircrafts, theaters, outdoor stadiums, and outdoor workshops.

REFERENCE SIGNS LIST 101 a planar heating element
101a an aerogel layer
101b a fiber layer
201 electric heating wires
301a an aerogel layer
301b a PET fiber layer
302 electric heating wires
801 a cover fiber layer
901 a seat
902 a cushion member
903 a shin
904 a seat heater

The invention claimed is:

1. A seat heater, comprising:
a planer heating element that has a fiber body including a plurality of fibers and a plurality of heating wires on the fiber body;
a cushion member located over a lower surface of the fiber body; and
a skin located above the fiber body,
wherein the fiber body has only under an interior portion and in a part of the plurality of fibers, a silica aerogel that is a silica porous body having pores with a mean pore diameter of 10 nm to 68 nm.

2. The seat heater according to claim 1, wherein an outer surface of the silica aerogel includes the pores, the pores are hydrophobic so as to exhibit a water contact angle of 110° or higher, and functional groups present on the outer surface include a trimethylsilyl group or methyl group.

3. The seat heater according to claim 1, wherein a starting material for the silica aerogel is an alkoxysilane or water glass, and the silica aerogel is the silica porous body that is prepared by use of a sol-gel synthesis reaction.

4. The seat heater according to claim 1, wherein the silica aerogel contains a powder containing any one or more of Aerosil fumed silica, colloidal silica, and hollow silica having a hollow structure, and the powder has a mean particle diameter of 10 nm to 200 nm.

5. A seat heater, comprising:
a planer heating element that has a fiber body including a plurality of fibers and a plurality of heating wires on the fiber body;
a cushion member located over a lower surface of the fiber body; and
a skin located above the fiber body,
wherein the fiber body has, in a part of the plurality of fibers, a silica aerogel that is a silica porous body having pores with a mean pore diameter of 10 nm to 68 nm, and
the fiber body has silica aerogel only in regions under the heating wires at an upper part inside the fiber body.

6. A seat heater, comprising:
a planer heating element that has a fiber body including a plurality of fibers and a plurality of heating wires on the fiber body;
a cushion member located over a lower surface of the fiber body; and
a skin located above the fiber body,
wherein the fiber body has, in a part of the plurality of fibers, a silica aerogel that is a silica porous body having pores with a mean pore diameter of 10 nm to 68 nm,
the fiber body has the silica aerogel in an upper part under the heating wires and in only one of lower regions between the heating wires on both sides of the heating wires.

7. A seat heater, comprising:
a planer heating element that has a fiber body including a plurality of fibers and a plurality of heating wires on the fiber body;
a cushion member located over a lower surface of the fiber body; and
a skin located above the fiber body,
wherein the fiber body has, in a part of the plurality of fibers, a silica aerogel that is a silica porous body having pores with a mean pore diameter of 10 nm to 68 nm,
the fiber body has the silica aerogel only in a region under the heating wires extending to the lower surface.

8. A seat heater comprising:
a planer heating element that has a fiber body including a plurality of fibers and a plurality of heating wires on the fiber body;
a cushion member located over a lower surface of the fiber body;
a skin located above the fiber body; and
a cover fiber layer that does not include on at least one surface an aerogel layer and that has a soft basis weight smaller than that of a layer impregnated with aerogel,
wherein the fiber body has, in a part of the plurality of fibers, a silica aerogel that is a silica porous body having pores with a mean pore diameter of 10 nm to 68 nm.

9. The seat heater according to claim 8, wherein the basis weight is 20 $g/m^2$ to 100 $g/m^2$.

10. The seat heater according to claim 8, wherein the cover fiber layer has a thickness of 0.1 mm to 0.3 mm.

11. The seat heater according to claim 1, wherein a surface of the silica aerogel and wall surfaces of the pores exhibit a water contact angle of 120° to 150°.

* * * * *